J. L. MILLER.
BANK CHECK.
APPLICATION FILED MAY 27, 1919.
1,336,647.
Patented Apr. 13, 1920.
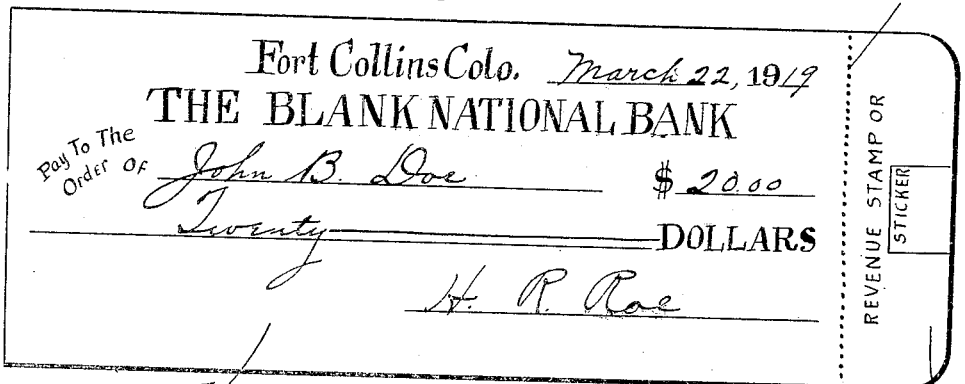
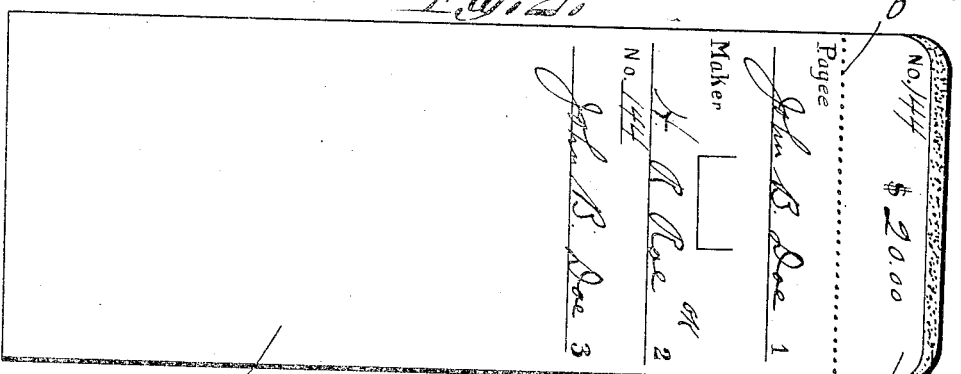
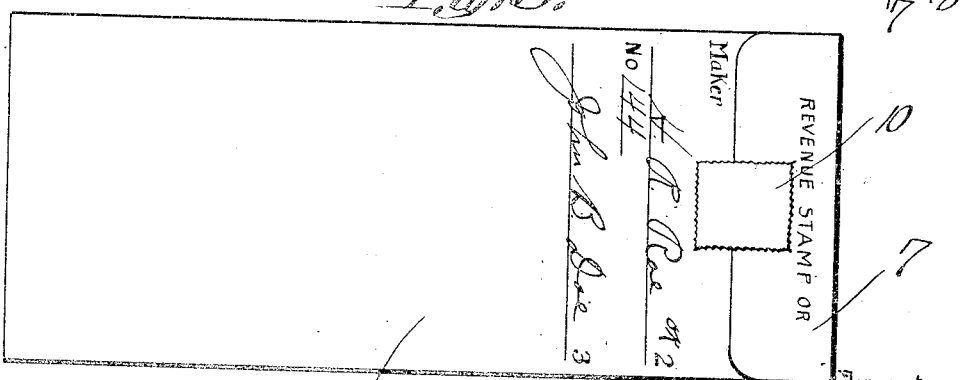

UNITED STATES PATENT OFFICE.

JOHN L. MILLER, OF FORT COLLINS, COLORADO.

BANK-CHECK.

1,336,647.    Specification of Letters Patent.    Patented Apr. 13, 1920.

Application filed May 27, 1919. Serial No. 300,031.

*To all whom it may concern:*

Be it known that I, JOHN L. MILLER, a citizen of the United States, residing at Fort Collins, in the county of Larimer and State of Colorado, have invented a new and useful Bank-Check, of which the following is a specification.

The present invention is a bank check or other negotiable paper, the primary object being to provide a check or other paper which will obviate the same being forged or the amount of the check raised; in the case of a negotiable paper to prevent signatures or other subject matter contained thereon being tampered with or altered in any way whatsoever.

Another object of this invention resides in the provision of a negotiable paper, such as, for instance, a bank check or draft, which will be of no value to a person other than the true owner, thus preventing forgery in case the check or draft becomes lost.

Another important object of the invention resides in the provision of a check or draft which includes a tab adapted to be folded and overlie the signature of the payee and the maker of the check and sealed in such position as to obviate the danger of the payee or in the case of an attempt to forge the check by a second person, as to prevent the amount of the check being raised or altered, the construction being such as to permit the bank teller readily tearing the tab from its attached end so that the teller may readily see the amount called for on the face of the check and whether the indorsement of the payee has been tampered with.

Another general object resides in the provision of a bank check or draft which is of a simple and inexpensive construction and one which will protect the interests of the general public.

With the above and other objects and advantages in mind, the invention consists of formations, arrangements, and manner of arranging the signatures of the parties concerned in the draft or other paper.

On the drawing:—

Figure 1 is an elevation of a bank check as constructed in accordance with my invention;

Fig. 2 is a view showing the reverse side of the check; and

Fig. 3 is a like view and showing the tab secured to the body of the check after the indorsements have been made by the maker.

My improved check or draft consists of a leaf 5 having the usual lines thereon for the signature of the parties concerned in the transaction and the amount to be paid as on the ordinary check or draft.

The checks may be bound in book form in the usual manner or they may be detached. A perforated line 6 extends transversely across the check adjacent one end to provide a tab 7.

The under face of this tab contains the number of the check and the amount called for on the face of the check. On the back of the check at that end adjacent the tab a plurality of blank spaces are provided which are preferably numbered, the upper space bearing the word "Payee" and adapted to contain the signature of the payee which is written by the maker of the check. The second space bears the signature of the maker together with any remarks of identification which the maker may desire to make. The third space bears the number of the check and is adapted to bear the signature or indorsement of the payee.

The outer edge of the tab is provided at its inner face with a suitable adhesive denoted at 8, a sticker or stamp 10 being secured to the outer face of the tab and projecting beyond the end of the same.

In the use of my improved check the maker writes the check in the usual manner and fills out the spaces on the back of the check and the inner face of the tab as outlined and then folds the tab upon the line 6 and attaches stamp 10 to the check proper and tab, thus covering or concealing the subject matter written on the back of the tab and the first blank space.

From this disclosure it will be apparent that it will be impossible to change the signature of the check or in any way tamper with the matter written thereon. When the check is presented to the bank or other party who is to honor the same the tab is torn on the perforated line to expose the hidden notations contained in space 1 on the back of the tab.

It is to be understood that I am not limited to the exact arrangement set forth but that the check may be embodied in other constructions and that I reserve the right to make any changes that I may be entitled to that may be embodied in the sub-joined claim.

What is claimed is:—

In a negotiable instrument, a blank, a tab secured to one end thereof provided with a weakened line, the blank being provided with spaces at one end thereof for indorsements, the inner face of the tab being adapted to contain identification marks, the tab being adapted to be folded upon the weakened line to overlie the first indorsement and to have its free end permanently sealed to the blank below the first indorsement, the tab being severed along the weakened line by the bank teller to expose the first indorsement.

In testimony that I claim the foregoing as my own, I have hereto affixed my signature in the presence of two witnesses.

JOHN L. MILLER.

Witnesses:
B. S. TEDMON,
J. M. RICHARD.